United States Patent [19]

Overman et al.

[11] Patent Number: 5,092,172

[45] Date of Patent: Mar. 3, 1992

[54] CANTILEVER BEAM G-SWITCH

[75] Inventors: David L. Overman, Silver Spring; Roland A. Granfors, Gaithersburg, both of Md.

[73] Assignee: The United States of America as represented by the Secretary of the Army, Washington, D.C.

[21] Appl. No.: 544,299

[22] Filed: Jun. 20, 1990

[51] Int. Cl.⁵ .................... H01H 35/02; G01P 15/08
[52] U.S. Cl. ................... 73/517 AV; 73/514; 200/61.45 R
[58] Field of Search .................. 73/514, 517 AV, 492, 73/61.49, 488, 510; 340/669, 467; 200/61.45 R, 61.49

[56] References Cited

U.S. PATENT DOCUMENTS

| | | | |
|---|---|---|---|
| 3,073,922 | 1/1963 | Miller | 340/669 |
| 3,553,482 | 1/1971 | Tavis | 200/61.45 R |
| 3,727,209 | 4/1973 | White et al. | 200/61.49 |
| 4,581,507 | 4/1986 | Bai et al. | 200/61.51 |
| 4,855,544 | 8/1989 | Glenn | 200/61.48 |
| 4,882,933 | 11/1989 | Petersen et al. | 73/517 R |
| 4,987,781 | 1/1991 | Reimann | 73/517 R |

Primary Examiner—Hezron E. Williams
Assistant Examiner—Craig Miller
Attorney, Agent, or Firm—Saul Elbaum; Paul Clohan

[57] ABSTRACT

A sensing device for sensing acceleration consisting of a number of miniature steel bearing balls as mass elements, a housing for locating and containing the mass elements, a printed circuit board for sensing a discrete number of levels of acceleration, and an array of cantilever beam flexure elements equal in number to that of the mass elements located between the mass elements and the printed circuit board.

7 Claims, 5 Drawing Sheets

CANTILEVER BEAM G-SWITCH

RIGHTS OF THE GOVERNMENT

The invention described herein may be manufactured, used and licensed by or for the United States Government for Governmental Purposes without payment to us of any royalty thereon.

BACKGROUND OF THE INVENTION

This invention relates to accelerometers, and in particular, to a device which utilizes the principles of mass-loaded cantilever beam accelerometers Many micromechanical sensing devices are now well known. Such devices include sensors of all types, for example, for sensing force, pressure, acceleration, etc. These devices are termed "micromechanical" because of their small dimensions - on the order of a few centimeters square or smaller. The small size is generally achieved by employing photolithographic technology similar to that employed in the fabrication of printed circuits. With this technology, the devices are as small as microelectronic circuits, and many such devices are often fabricated in a batch on a single substrate, thereby spreading the cost of processing that substrate among many individual devices. The resulting low unit cost increases the applications for such devices.

Prior art micromechanical acceleration sensors have suffered from a number of disadvantages which have raised their cost of manufacture, limited their accuracy, and precluded their use in many applications. For example, for greater sensitivity to small acceleration forces, the cantilever beam suspending the mass must be more flexible and must work across an exceedingly small gap. Slight distortions of the beams result in proportionally large changes in the tiny gap used to establish acceleration threshold. The manufacturing, alignment and adjustment steps required to achieve high precision and reliability add cost to the product while reducing yield.

OBJECTS AND SUMMARY OF THE INVENTION

It is therefore a primary object of the present invention to overcome the drawbacks of the prior art and to provide a device that is inexpensive to manufacture while providing high precision.

A further object of the present invention is to provide a miniature accelerometer that will sense different discrete levels of acceleration.

The Cantilever Beam G-Switch is designed to provide a miniature package of several high-precision, acceleration actuated switches that is especially inexpensive to manufacture. A typical Cantilever Beam G-Switch contains an array of eight acceleration activated switches, each of which closes at a different acceleration level between approximately 100 and 4,000 g's. Package size, including the nine-pad connector can be as small as 0.40"×0.46"×0.11" which results in a volume of only 0.02 cubic inches.

The Cantilever Beam G-Switch can be used to monitor acceleration for many purposes. An example would be to use the Cantilever Beam G-Switch to monitor centrifugal force in a gun projectile which spins at different rates depending on the amount of charge used to fire it. It can also be used to sense the linear acceleration of projectile launch or projectile impact with a target. The Cantilever Beam G-Switch would be a component in the projectile fuze's safety device, where the information would be used to determine when to transition from a safe to an armed condition.

The Cantilever Beam G-Switch beams are photo-etched from sheet metal and are mass-loaded by miniature balls; the preferred embodiment uses common steel bearing balls. This mass-loading increases contact force and reliability, and permits the beams to be very short for a given actuation level. The rolling action of the balls also permits accurate sensing of acceleration in the presence of extreme side-loads. The beams are also prebiased (deflected) toward closure by a small amount in order to prevent them from vibrating when exposed to the shock and vibration forces which occur during normal handling and transportation.

DETAILED DESCRIPTION OF THE PREFERRED EMBODIMENTS

Figure 1:
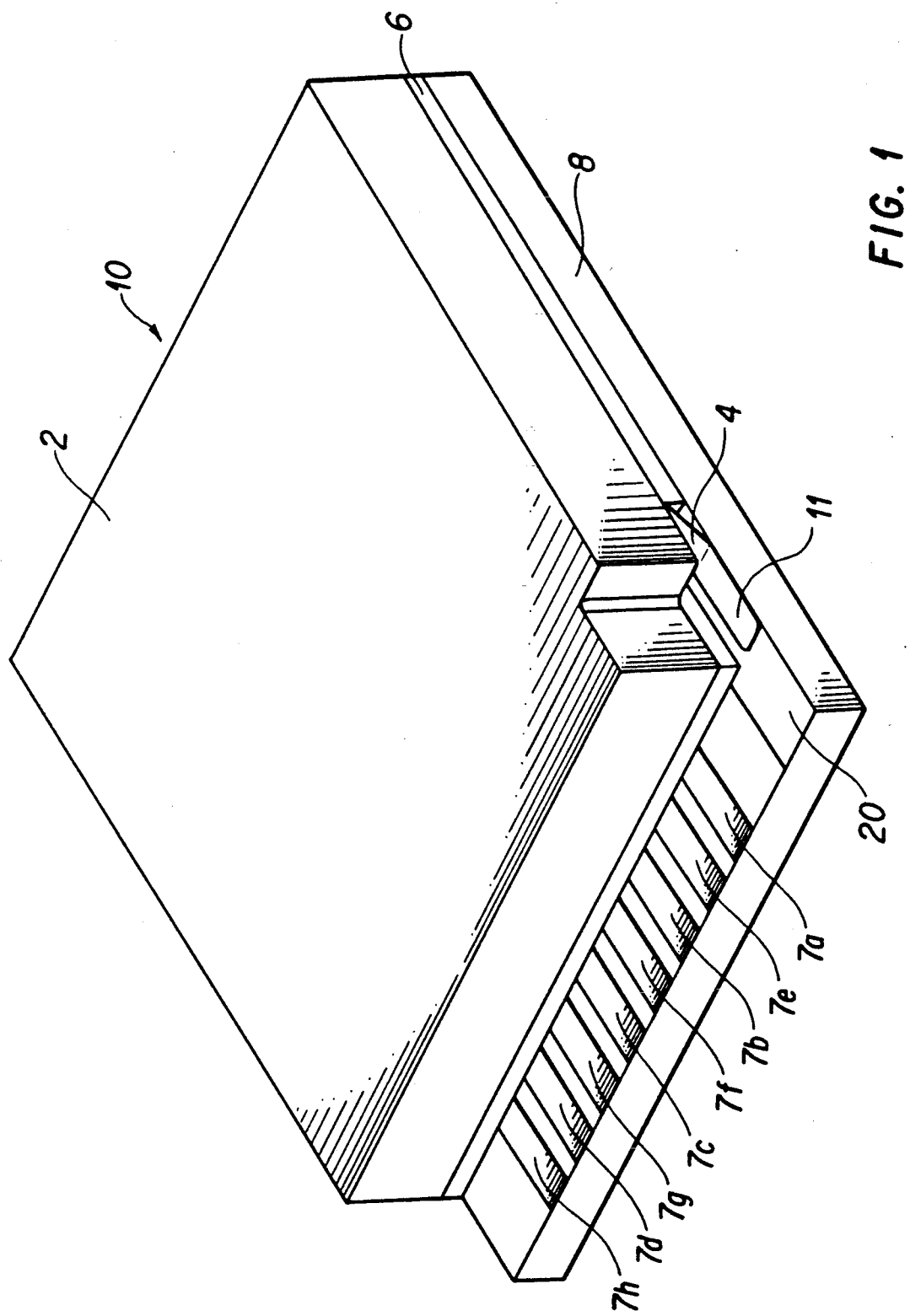
FIG. 1 is a perspective view of the present invention, a Cantilever Beam G-Switch.
Figure 2:
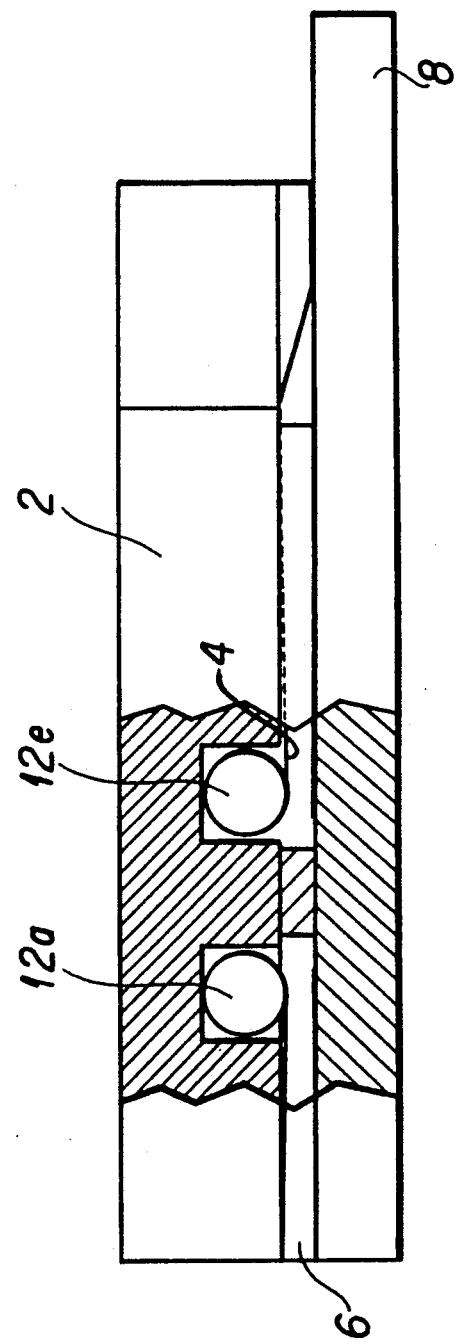
FIG. 2 is an edge view with a partial cut-away of the present invention, a Cantilever Beam G-Switch.
Figure 3:
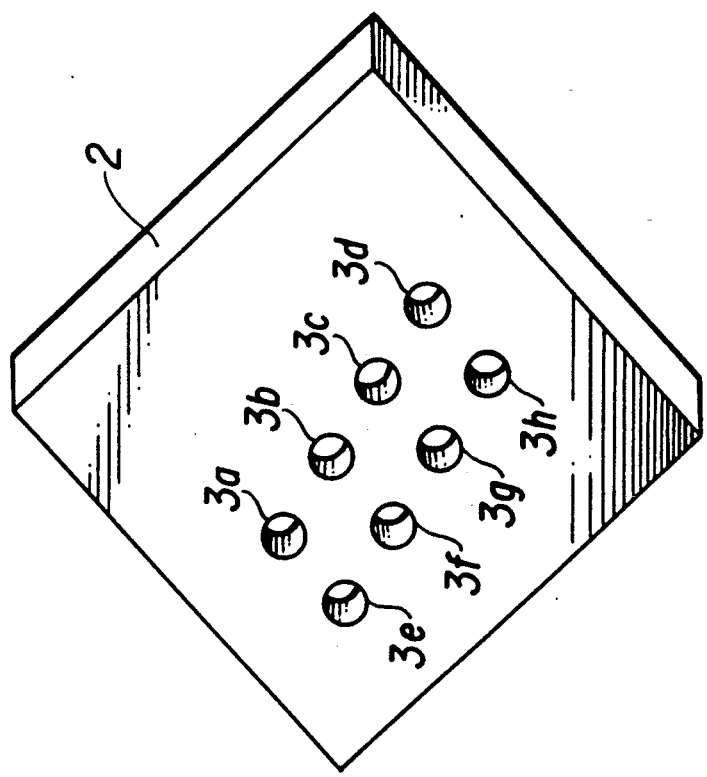
FIG. 3 is a perspective view of the ball plate layer of the present invention.

Referring now to FIG. 1, a perspective view of the Cantilever Beam G-Switch is shown generally by the numeral 10. Construction of the Cantilever Beam G-Switch is the key to its precision and low-cost In addition to containing eight miniature steel bearing balls, it is made from four other layers. The first layer is the ball-plate layer 2. This layer can be made from two separate pieces, but the preferred design is a single-piece clear plastic molding as shown in FIG. 3. Blind holes 3a, 3b, 3c, 3d, 3e, 3f, 3g, and 3h located in ball plate layer 2 have generally flat bottoms and their depth is slightly less than the diameter of the steel bearing balls that will be placed in them. For example, if a bearing ball having a diameter of 1/32 inch (0.03125) is used, then the depth of holes 3a-3h would be 0.028 inches. This causes the bearing balls to project above ball plate layer 2 by about 0.003 inches and causes a deflection of the tips of the cantilever beams on the adjacent layer by this amount, thus providing the prebias mentioned above.

Figure 4:
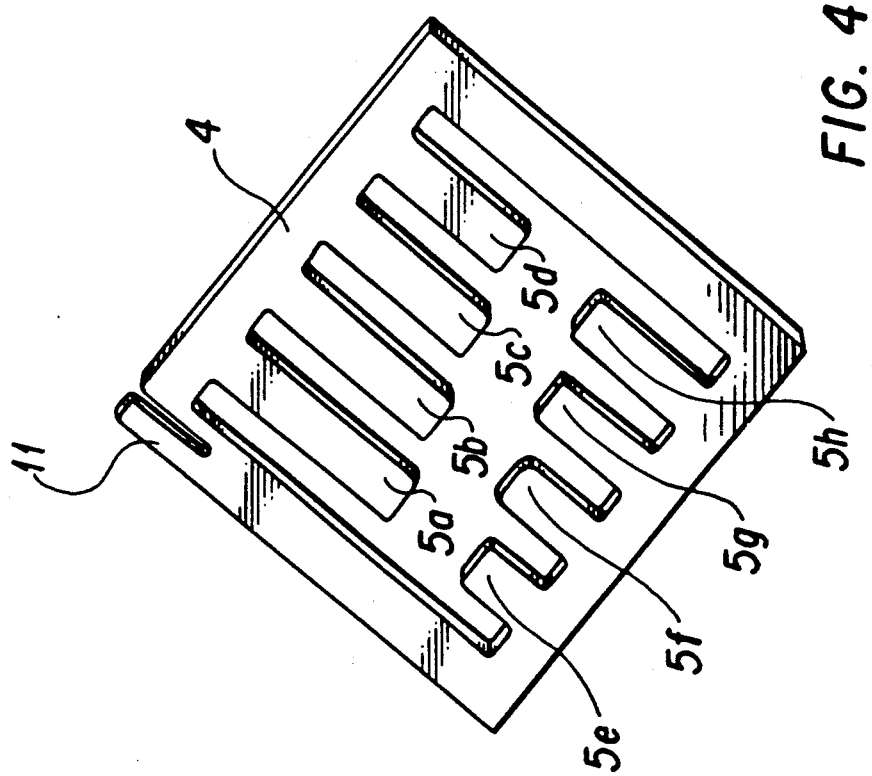
FIG. 4 is a perspective view of the spring plate layer of the present invention.

The second layer of Cantilever Beam G-Switch 10 is the spring plate layer 4. The construction of spring plate layer 4 is shown in FIG. 4 and consists of eight cantilever beams 5a, 5b, 5c, 5d, 5e, 5f, 5g, and 5h which are photo-etched from thin sheet-metal. The preferred embodiment is made from 0.001 inch thick heat-treated and gold-plated beryllium copper. This process yields precise, stress-free beams with fine design detail, such as the radiused corners shown in FIG. 4. Variations in material thickness or temper or in beam patterning, etc. will affect all the beams in the spring plate layer 4 equally. Therefore, the ratios of bias acceleration for closure from beam to beam in a given spring plate layer 4 will not be affected by such variations. Also, by fabricating many spring plate layers all at the same time from a single sheet of metal, the uniformity from layer to layer can also be very high. The beam length in the illustrated embodiment is lengths of 3,4,5,6,7,8,9, and 10 times a unit length of 0.0183. Thus in FIG. 4, the length of cantilever beam 5e would be 0.0549 (3 times 0.0183), the length of cantilever beam 5f would be 0.0732 (4 times 0.0183), etc. Obviously, the length of the various cantilever beams can be made any value desired in order to establish closure levels appropriate for a given application.

Figure 5:
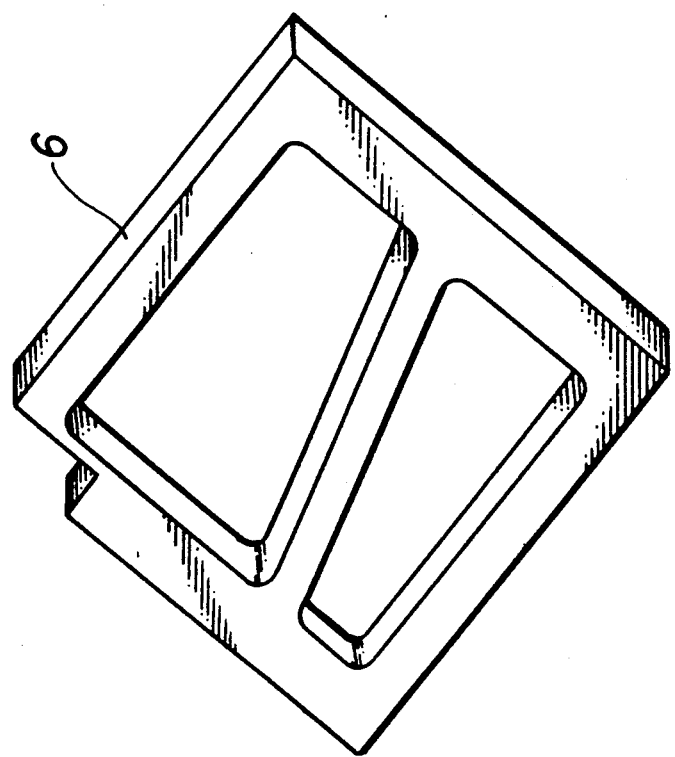
FIG. 5 is a perspective view of the spacer plate layer of the present invention.

The third layer of Cantilever Beam G-Switch 10 is spacer plate layer 6, shown in FIG. 5, and in the preferred embodiment made from molded plastic. In the preferred embodiment, this layer is approximately 0.016 inches thick. The thickness of spacer plate layer 6 determines the total deflection of cantilever beams 5a-5h required to close each cantilever beam switch and is one of the main factors in setting the acceleration level required for closure and maximum stress exerted on each cantilever beam 5a-5h. Using a single precision spacer plate layer 6 for all beams and locating the miniature steel bearing balls right at the tips of the cantilever beams 5a-5h insures an exact value for the deflection of each cantilever beam switch.

Figure 6:
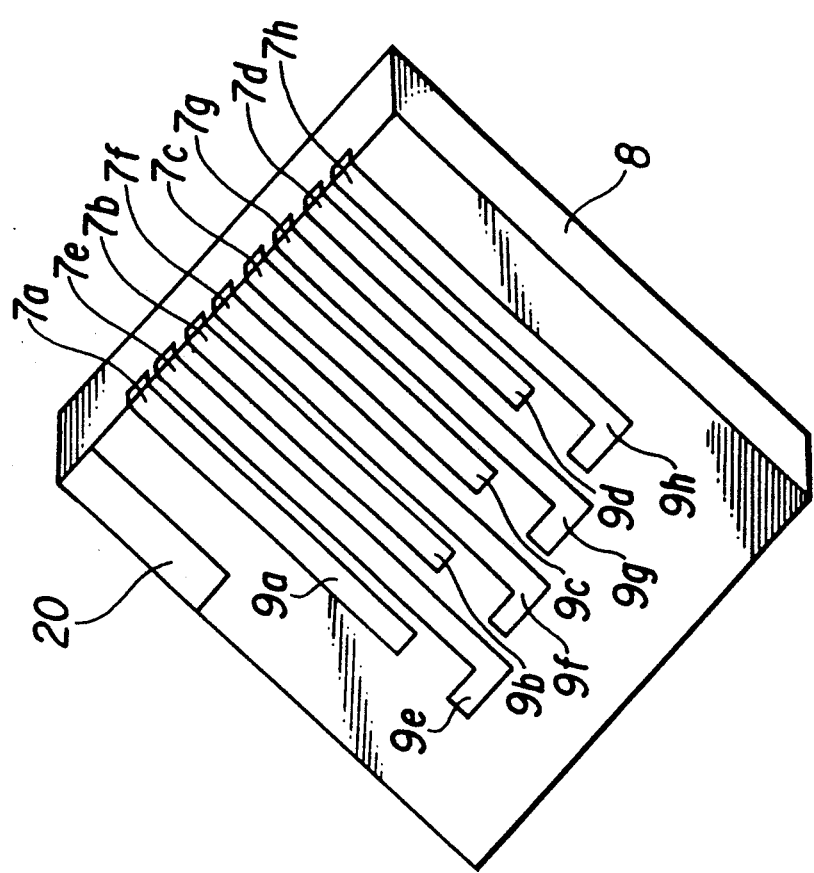
FIG. 6 is a perspective view of the contact plate layer of the present invention.

The fourth layer of the Cantilever Beam G-Switch 10 is the contact plate layer 8. shown in FIG. 6. In the preferred embodiment, this layer is made from 1/32 inch thick copper clad printed circuit board material. Beam switch contact pads 9a-9h are located at the end of each track, and external contact pads 7a-7h are located beyond the edge of the ball plate layer 2 approximately 1/16 inch in the preferred embodiment as shown in FIG. 1 in order to provide an external contact pad to interface with conventional external power and monitor circuits that are well known in the art and therefore require no further discussion here. The tracks terminating in the two pads are photo-etched in the contact plate layer's copper cladding as in a printed circuit board. For high contact reliability, it is desirable to gold plate the contact pad at the end of the tracks.

The Cantilever Beam G-Switch 10 is assembled to form a sealed unit by using three thin layers of adhesive applied by printing in appropriate locations. This method is well known in the art. If the layers are made of ceramic sheets instead of plastic, then sealing is accomplished with the usual oven-fired solder and glass-frit printings known in the hybrid circuit industry. Contact plate layer 8, spacer plate layer 6 and spring plate layer 4 are assembled first and this subassembly is then placed on ball plate layer 2 after the eight miniature steel bearing balls are placed into the eight blind holes 3a-3h. Electrical contact between spring plate layer 4 and contact plate layer 8 can be achieved in different ways. Contact tab 11 on spring plate layer 4 can be deformed by stamping in a die-set such that it would make pressure contact with pad 20 at assembly. Such contact would also be enhanced by acceleration forces when in use. An alternative method would be to have a small window in ball plate layer 2 aligned over contact tab 11 and the end of pad 20. After assembly, electrodes would be inserted through the window to depress contact tab 11 and to solder or weld it to pad 20.

Figure 7:
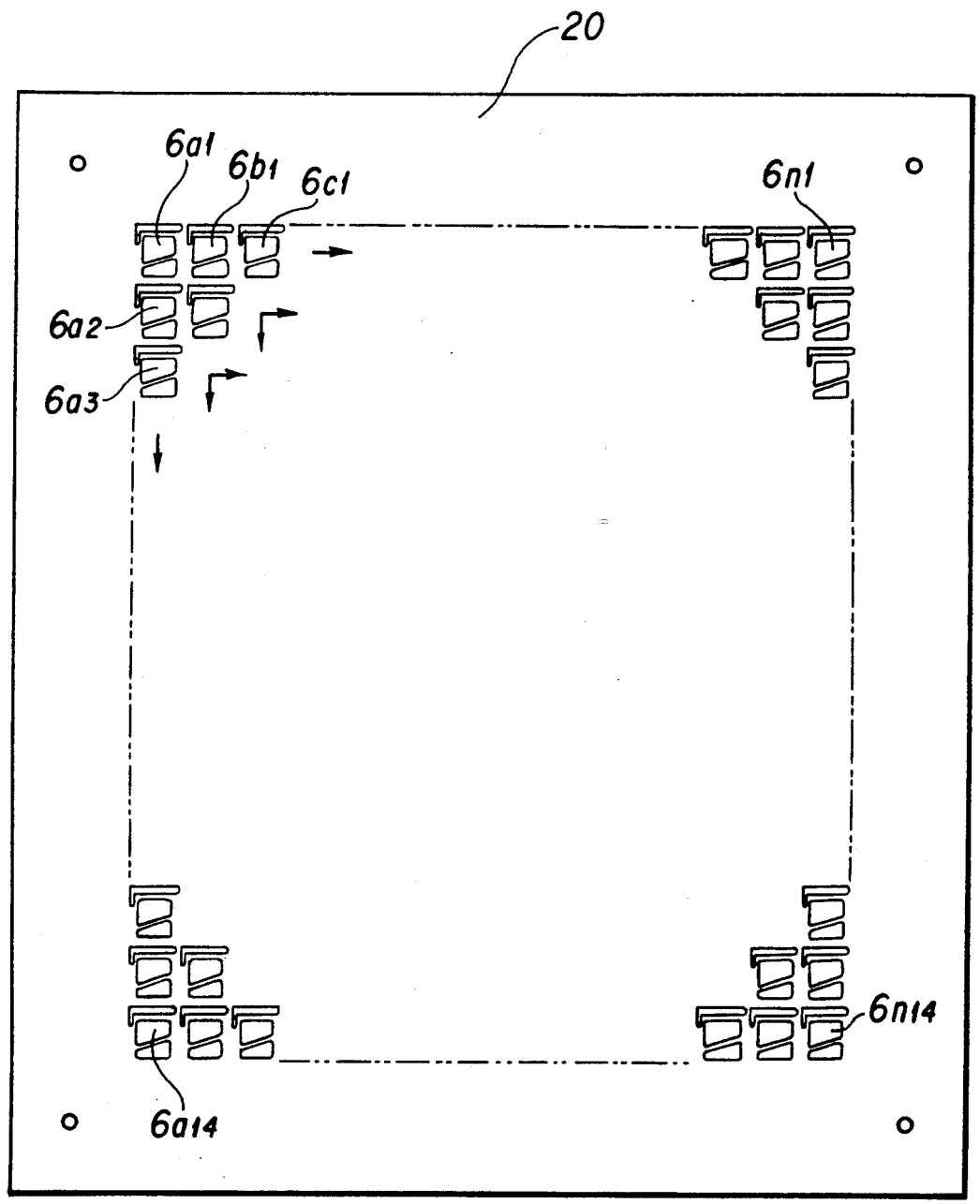
FIG. 7 is a plane view of a panel containing 196 spacer plates.

To efficiently manufacture Cantilever Beam G-Switch 10, the individual components are built in large panels as illustrated in FIG. 7 in which fourteen rows ($6a_1$-$6a_{14}$) of spacer plate layer 6 and fourteen columns ($6a_1$-$6n_1$) of spacer plate layer 6 are located on panel 20 resulting in 196 (14×14) spacer plate layers. In a similar manner, 196 ball plate layers, contact plate layers and spring plate layers are formed. After an entire panel of 196 Cantilever Beam G-Switches is assembled, the resulting panel assembly is embedded on a support surface and the individual Cantilever Beam G-Switches are diced apart using special slitting saws in a fashion similar to the dicing operation used to separate integrated circuits manufactured on silicon wafers. The illustrations show one way in which the panels could be laid out to form Cantilever Beam G-Switch assemblies that could be easily separated without damage to the seal or the external contact pads.

Building Cantilever Beam G-Switch 10 assemblies in large panels not only provides a high degree of uniformity and precision from switch to switch, but it also allows the performance of all the switches in a particular panel or manufacturing lot to be characterized economically by testing just a few samples. A variation in the thickness of the metal sheet used to make the spring plate layers 4 for example would affect all the switches in that lot, and the resulting difference in performance could be specified as a parameter to be compensated for by the switch mounting or by the circuit used to interrogate the switch in the given application. Since the ratio of closure acceleration from cantilever beam t cantilever beam in a given array should be uniform, a programmable circuit can be made to compensate for variations in performance by reading the closure level of a typical beam in the array during a test in the manufacturing plant.

The two important design equations for the Cantilever Beam G-Switchs are as follows:

Acceleration needed for Closure: (1)

$$G = XET^2/L^3(1.5Lp_2 + 16\pi r^3 p_1/3WT)$$

Maximum beam stress at Closure:

$$S = GL(3Lp_2 + 8\pi r^3 p_1/WT)/T \qquad (2)$$

| Where: | | |
|---|---|---|
| E = Spring Modulus | X = Beam Deflection |
| r = Ball Radius | L = Beam Length |
| $p_1$ = Ball Density | W = Beam Width |
| $p_2$ = Beam Density | T = Beam Thickness |

In the preferred embodiment, the following parameters have been measured and calculated:
Ball Diameter = 0.03125
Ball Density = 0.281
Spring Density = 0.298
Spring Modulus = 19,000,000
Max Stress = 165,000
Spring Thickness = 0.001
Beam Width = 0.040
Beam Deflection = 0.016

| Cantilever Beam Length | Bias-G | Stress-ksi |
|---|---|---|
| 0.055 | 3,858 | 153 |
| 0.073 | 1,622 | 88 |
| 0.092 | 797 | 55 |
| 0.11 | 458 | 39 |
| 0.128 | 286 | 29 |
| 0.146 | 190 | 22 |
| 0.165 | 129 | 18 |

| Cantilever Beam Length | Bias-G | Stress-ksi |
| --- | --- | --- |
| 0.183 | 93 | 14 |

To those skilled in the art, many modifications and variations of the present invention are possible in light of the above teachings. It is therefore to be understood that the present invention can be practiced otherwise than as specifically described herein and still will be within the spirit and scope of the appended claims.

We claim:

1. A layered electromechanical switch for sensing one or more discrete levels of acceleration, said switch comprising:
   one or more mass elements;
   a housing layer containing one or more blind holes, wherein each hole is shaped to accept a single mass element and to limit translation of said mass element in all directions except into and out of said hole, whereby each mass element will be located and contained within a corresponding blind hole when at rest;
   a spring plate layer comprising one or more flexure elements, wherein each flexure element has both a fixed end and a free end, said free end being located a discrete distance from the fixed end and beneath a corresponding mass element which is not fixedly attached to said flexure element, whereby each flexure element will deflect a predetermined distance for a given level of acceleration;
   a sensing means layer to detect contact with said flexure element or flexure elements upon deflection;
   a spacer layer disposed between said spring plate layer and said sensing means layer.

2. The invention of claim 1 wherein each mass element is comprised of steel.

3. The invention of claim 1 wherein said mass element or elements are spherical.

4. The invention of claim 3 wherein each blind hole has a depth which is slightly less than the diameter of a corresponding mass element, whereby each mass element will protrude from a corresponding blind hole when at rest, thereby creating a prebias in the corresponding flexure element.

5. The invention of claim 1 wherein said sensing means layer comprises a printed circuit board, said circuit board provided with one or more conductive tracks, each track having a contact pad at the periphery of the sensing means layer and a contact pad located beneath the free end of a corresponding flexure element.

6. A layered electromechanical switch for sensing one or more discrete levels of acceleration, said switch comprising:
   one or more spherical mass elements;
   a housing layer containing one or more blind holes, wherein each hole has a depth which is slightly less than the diameter of a corresponding spherical mass element, whereby each mass element will protrude from and be located and contained within a corresponding blind hole when at rest;
   a spring plate layer comprising one or more flexure elements, wherein each flexure element has both a fixed end and a free end, said free end being located a discrete distance from the fixed end and beneath a corresponding spherical mass element which is not fixedly attached to said flexure element, whereby each flexure element will be prebiased and sensitive to a predetermined level of acceleration in one direction;
   a sensing means layer comprising a printed circuit board, said circuit board provided with one or more conductive tracks, each track having a contact pad at the periphery of the sensing means layer and a contact pad located beneath the free end of a corresponding flexure element;
   a spacer layer disposed between said spring plate layer and said sensing means layer.

7. The invention of claim 6 wherein each spherical mass element is comprised of steel.

* * * * *